United States Patent
Bode et al.

(10) Patent No.: US 8,136,426 B2
(45) Date of Patent: Mar. 20, 2012

(54) ROTARY TABLE MOUNTING AND DRIVE DEVICE

(75) Inventors: Helmut Bode, Herzogenaurach (DE); Martin Schreiber, Herzogenaurach (DE); Gunter Schmid, Nuremberg (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 490 days.

(21) Appl. No.: 12/375,985

(22) PCT Filed: Jul. 4, 2007

(86) PCT No.: PCT/EP2007/056716
§ 371 (c)(1),
(2), (4) Date: Feb. 2, 2009

(87) PCT Pub. No.: WO2008/015069
PCT Pub. Date: Feb. 7, 2008

(65) Prior Publication Data
US 2009/0308285 A1  Dec. 17, 2009

(30) Foreign Application Priority Data
Aug. 2, 2006 (DE) .......................... 10 2006 036 051

(51) Int. Cl.
*B23Q 16/00* (2006.01)
(52) U.S. Cl. ................................. 74/813 R

(58) Field of Classification Search .......... 74/813 R, 74/813 C; 310/90.5
See application file for complete search history.

(56) References Cited

U.S. PATENT DOCUMENTS

| | | | | |
|---|---|---|---|---|
| 4,438,987 A * | 3/1984 | Kapaan | .................. | 310/90.5 |
| 4,749,898 A * | 6/1988 | Suzuki et al. | .................. | 310/114 |
| 5,998,899 A * | 12/1999 | Rosen et al. | .................. | 310/90.5 |
| 6,543,289 B1* | 4/2003 | Jinzenji et al. | .................. | 73/668 |
| 6,886,225 B2* | 5/2005 | Pasquetto | .................. | 29/27 C |

FOREIGN PATENT DOCUMENTS

| | | |
|---|---|---|
| DE | 243456 | 3/1987 |
| DE | 4128276 | 5/1992 |
| DE | 4331042 | 3/1995 |
| DE | 19953118 | 5/2001 |
| DE | 10204965 | 7/2003 |
| DE | 202004006697 | 5/2005 |
| JP | 2002354778 A * | 12/2002 |
| JP | 2006062045 A * | 3/2006 |

* cited by examiner

*Primary Examiner* — Vicky Johnson
(74) *Attorney, Agent, or Firm* — Volpe and Koenig, P.C.

(57) ABSTRACT

A rotary table mounting and drive device (1), including a rotary table (3) which is rotatably mounted on a frame (2) and for the mounting of which an axial/radial rolling bearing arrangement (4) and an active magnetic bearing arrangement (5) are provided, has an electric direct drive (19) which is preferably a torque motor having a rotor (20) rigidly connected to the rotary table (3) and a stator (21) rigidly connected to the frame (2).

11 Claims, 4 Drawing Sheets

ROTARY TABLE MOUNTING AND DRIVE DEVICE

BACKGROUND

The invention relates to a device for mounting and for driving a rotary table, in particular, a machine tool.

Rotary table mountings with rolling or sliding bearing arrangements are known, for example, from DE 20 2004 006 697 U1. In DE 43 31 042 A1, a rotary table drive of a machine tool is described that should operate without play. The mounting of rotary tables is possible, in principle, by hydrostatic bearing arrangements, like those known, for example, from DD 24 34 56 A1, or by means of air bearing arrangements, like those known from DE 199 53 118 A1. Vibrations that occur, in particular, during the cutting of work pieces, can represent a general problem in rotary table mountings and drives.

SUMMARY

The invention is based on the objective of providing a rotary table mounting and drive device that is particularly insensitive to mechanical vibrations.

This objective is met according to the invention by a device with the features of claim 1. This device that is suitable, in particular, for a machine tool for the mounting and for the driving of a rotary table has two mounting devices, namely an axial-radial rolling bearing arrangement and also an active magnetic bearing arrangement that is understood to be a magnetic bearing arrangement operating with an electromagnet. In addition to these mounting devices that are used for the rotatable mounting of the rotary table on a frame, the device according to the invention has an electric direct drive whose rotor is connected rigidly to the rotary table and whose stator is connected rigidly to the frame. The combination of the rolling bearing arrangement, active magnetic bearing arrangement, and electric direct drive allows an especially stiff mounting and a play-free drive of the rotary table with a simultaneously compact construction of the entire device. The active magnetic bearing arrangement advantageously acts exclusively in the axial direction with respect to the rotational axis of the rotary table. Alternatively, a radial or a combined axial and radial active magnetic bearing arrangement can also be utilized.

The electric direct drive of the rotary table is advantageously constructed as a permanent magnet-excited synchronous motor, also designated as a torque motor. In an advantageous construction, the excitable primary part of the torque motor forms the stator of the electric direct drive, while the rotor connected rigidly to the rotary table is equipped exclusively with the permanent magnet. Advantageously, permanent magnets made from magnetic material with high magnetic energy are used, such as, for example, NdFeB or SmCo. The permanent magnets are preferably fastened to a ring made from sintered material, wherein cyclic magnetization losses are kept low.

The position and/or the state of motion of the rotary table can be detected by one or more sensors. For determining positional information, sensors that operate optically, inductively, magnetically, capacitively, tactilely, with eddy current, or with ultrasound are suitable. In the case of an optical measurement method, reflex measurements or triangulation measurements come into consideration. Acceleration sensors that are suitable, in particular, for measuring axial acceleration on the rotary table, operate, for example, with seismic mass or with piezoceramic elements. The deflection of a seismic mass can be detected, in particular, by wire resistance strain gauges or inductively. Independent of the construction of the one or more sensors, these are advantageously linked with the active magnetic bearing arrangement such that forces that oppose the vibrations of the rotary table are generated by the driving of the magnetic bearing arrangement. A control device provided for this purpose advantageously comprises several controllers connected in a cascade, namely position controllers, velocity controllers, acceleration controllers, and/or current controllers. Power electronics by which the individual coils of the active magnetic bearing arrangement are operated are advantageously controlled by pulse-width modulation. The excitable coils of the magnetic bearing arrangement are advantageously connected to the frame of the rotary table mounting and drive device, independent of the type of control, and form the primary part of the magnetic bearing arrangement, while a secondary part of the magnetic bearing arrangement connected to the rotary table is equipped with permanent magnets. Individual permanent magnets of the secondary part of the magnetic bearing arrangement are advantageously each arranged in an annular region.

In one configuration that is advantageous with respect to both spatial requirements and also the force distribution, the active magnetic bearing arrangement is arranged in the radial direction outside of the axial-radial rolling bearing arrangement, while the latter bearing arrangement and the electric direct drive are arranged in axially adjacent, radially overlapping regions.

Due to the arrangement of the primary parts of the direct drive and also the magnetic bearing arrangement on the frame of the mounting and drive device, no supply of electrical energy to the rotary table is required. If signals detected by a sensor are to be transmitted from the rotary table to the frame, a transmission of electrical signals can be realized, for example, by slip-ring contacts. Optical signals delivered by a sensor can be transmitted optionally by an optical waveguide. In each case, the received signals or data generated from these signals can be transmitted to a data-processing system that also allows remote monitoring of the rotary table mounting and drive device, in particular, its vibrating components, i.e., the sensors and also the control device linking these components with the active magnetic bearing arrangement.

BRIEF DESCRIPTION OF THE DRAWING

Below, an embodiment of the invention will be explained in greater detail with reference to a drawing. Shown herein are.

DETAILED DESCRIPTION OF THE PREFERRED EMBODIMENT

Figure 1:
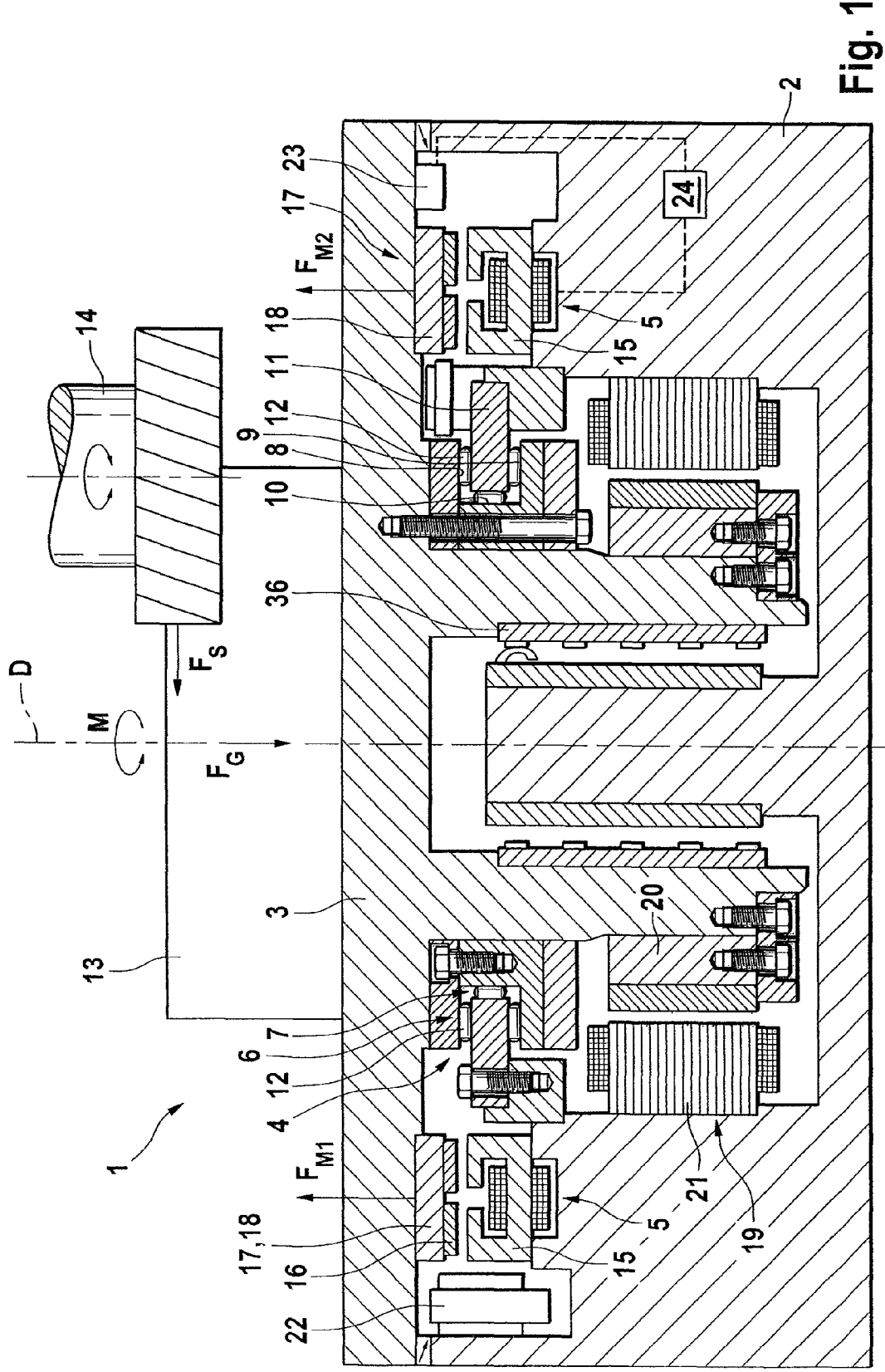
FIG. 1 a schematic cross-sectional view of a rotary table mounting and drive device, FIG. 2 a view of the arrangement of several coils that form parts of an active magnetic bearing arrangement on a frame of the device according to FIG. 1, FIG. 3 a view showing the principle construction of a control device of the device according to FIG. 1, and FIG. 4 in an overview diagram, the device according to FIG. 1 with attached power-supply and data-processing devices.

FIG. 1 shows simplified a rotary table mounting and drive device 1 that comprises a frame 2 and also a rotary table 3 mounted rotatably on this frame. For mounting the rotary table 3, an axial-radial rolling bearing arrangement 4 and also an active magnetic bearing arrangement 5 are provided. The axial-radial rolling bearing arrangement 4 represents a combination of a double-acting axial bearing arrangement 6 with a radial bearing arrangement 7. Here, two raceways 8, 9 of the axial bearing arrangement 6 together with a raceway 10 of the radial bearing arrangement 7 arranged between these two raceways describe U-shaped contours in which a ring 11 fastened to the frame 2 engages. Cylinder rollers 12 as roller bodies roll between the ring 11 and the raceways 8, 9, 10.

A work piece 13 that is processed by a rotating tool 14 is arranged on the rotary table 3 that is part of a machine tool. The force of gravity of the work piece 13 is designated with $F_G$. A cutting force is designated with $F_S$. The cutting or processing force $F_S$ generates a torque M acting on the rotary table 3. The rotational axis of the rotary table 3 is designated with D. Below, the terms "radial" and "axial" refer to this rotational axis D if not indicated otherwise.

Located radially outside of the axial-radial rolling bearing 4 and in the same axial region is the active magnetic bearing 5 that is assembled from an excitable primary part 15 connected to the frame 2 and a secondary part 17 connected to the rotary table 3 and equipped with permanent magnets 16. The permanent magnets 16 have an annular or annular segment construction. In each case, permanent magnets 16 are located in different, in the embodiment, two annular regions. The individual permanent magnets 16, for example, rare-earth magnets, are fastened to a ring 18 made from sintered material and transmit magnetic forces $F_{M1}$, $F_{M2}$ via these magnets to the rotary table 3. According to the control of the components of the primary parts 15, the magnetic forces $F_{M1}$, $F_{M2}$ can act in the direction of the force of gravity $F_G$ or in the opposite direction.

The rotational drive of the rotary table 3 is provided by an electric direct drive 19, namely a torque motor. The torque motor 19 constructed as a permanent magnet-excited synchronous motor has a rotor 20 connected to the rotary table 3 and a stator 21 connected to the frame 2.

Here, the stator 21 is constructed as an excitable primary part and the rotor 20 is constructed as a permanent magnet-equipped secondary part of the synchronous motor 19. In the shown embodiment, the torque motor 19 involves an internal rotor motor; however, an external rotor motor can also be utilized as an electric direct drive 19. In both cases, the direct drive 19 is distinguished, in particular, by freedom from play and hysteresis.

Figure 2:
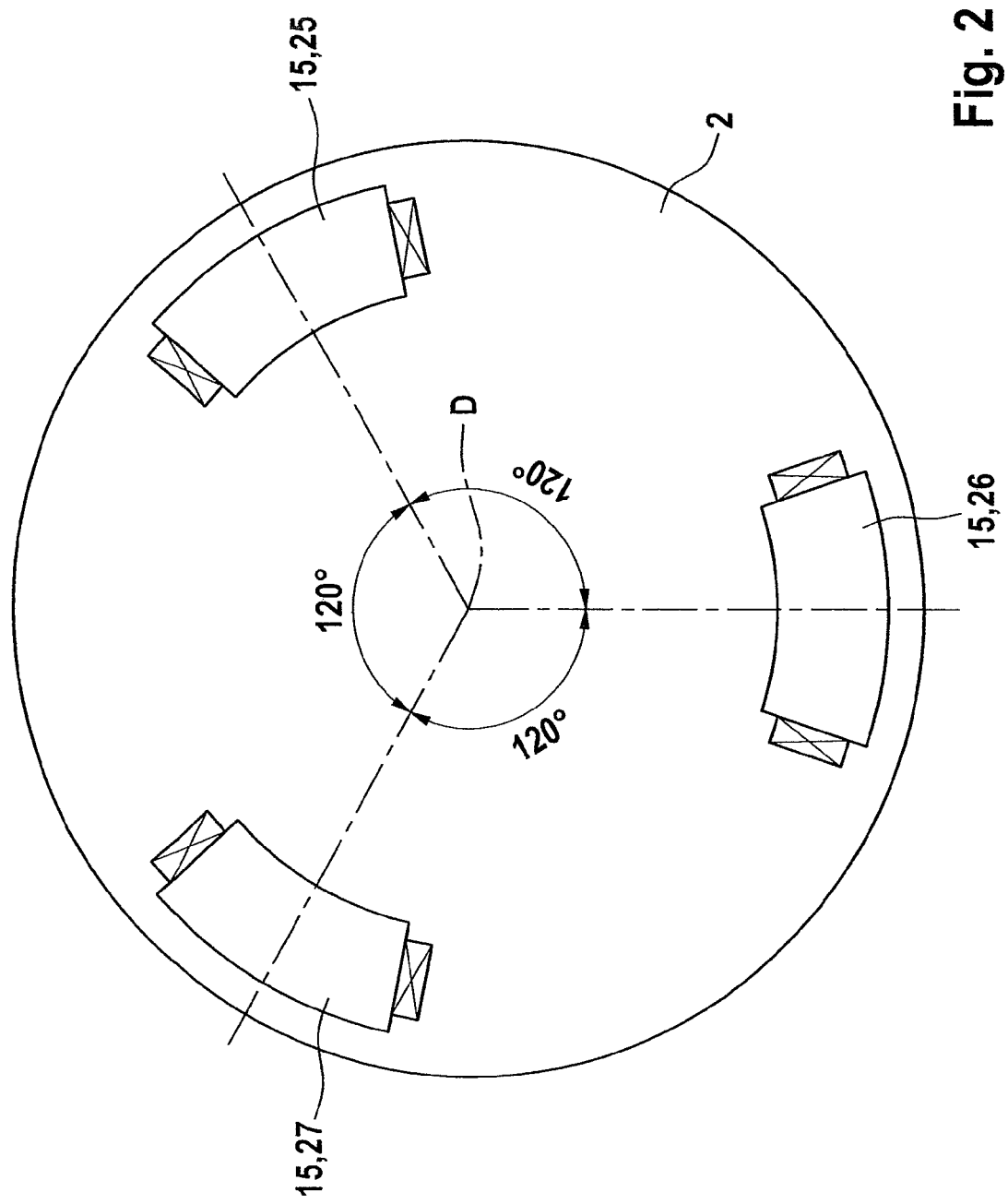

The positioning and also the movement state of the rotary table 3 can each be detected by at least one path sensor 22 and acceleration sensor 23. The sensors 22, 23 allow, in particular, the detection of mechanical vibrations and are linked to the active magnetic bearing arrangement 5 by means of a control device 24. As shown simplified in FIG. 2, the primary part 15 of the active magnetic bearing arrangement 5 comprises, for example, three coils 25, 26, 27 that are distributed uniformly across the extent and that interact with the secondary part 17 of the magnetic bearing arrangement 5. Just like several coils 25, 26, 27 are arranged rotationally symmetric about the rotational axis D, several, for example, three acceleration sensors 23 are arranged rotationally symmetric about the rotational axis D. This allows the location-dependent detection and evaluation of vibration states of the rotary table 3. The control device 24 is constructed such that forces that counteract the detected vibrations are introduced into the rotary table 3 by the coils 25, 26, 27, wherein according to the type of vibrations, the magnetic forces $F_{M1}$, $F_{M2}$ generated by different coils 25, 26, 27 at a certain time can be directed in the same or a different direction. In other words: in a first operating state of the control device 24, all of the coils 25, 26, 27 are controlled such that all of the forces $F_{M1}$, $F_{M2}$ generated by the coils 25, 26, 27 act in the same direction. In contrast, in a second operating state of the control device 24, the force $F_{M1}$ that is generated by the coil 25 is directed opposite the force $F_{M2}$ that is generated by the coils 26, 27. Thus, the vibration absorbing device realized by the active magnetic bearing arrangement 5 is in the position to adjust to different vibration states of the rotary table 3.

Figure 3:
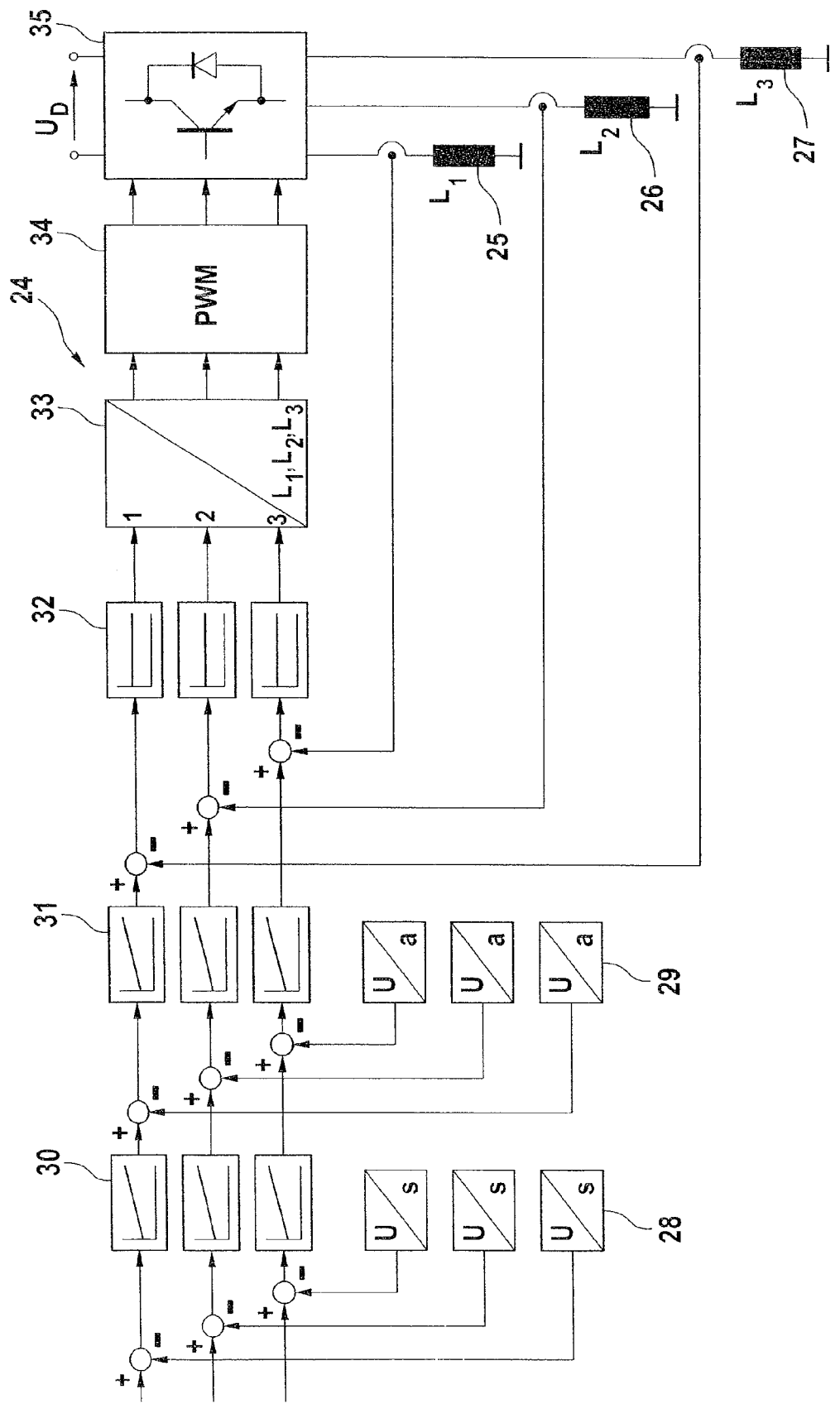

The control device 24 acts with a cascaded control as shown in FIG. 3. Different measurement transducers 28, 29 that are connected to the sensors 22, 23 or are integrated in these sensors each deliver an output voltage U that corresponds to positional or acceleration information s, a. In addition to position controllers 30 shown in FIG. 3 and acceleration controllers 31, optional velocity controllers are present. In each case, the controllers 30, 31 interact with a current controller 32 that leads input signals, in turn, to a signal transducer 33. The signal transducer 33 controls the coils 25, 26, 27, also designated as inductors $L_1$, $L_2$, $L_3$ in FIG. 3, by a pulse-width modulator 34 and power electronics 35 to which a voltage $U_D$ is applied. The current profile in the inductors $L_1$, $L_2$, $L_3$ is here not necessary in phase.

Figure 4:
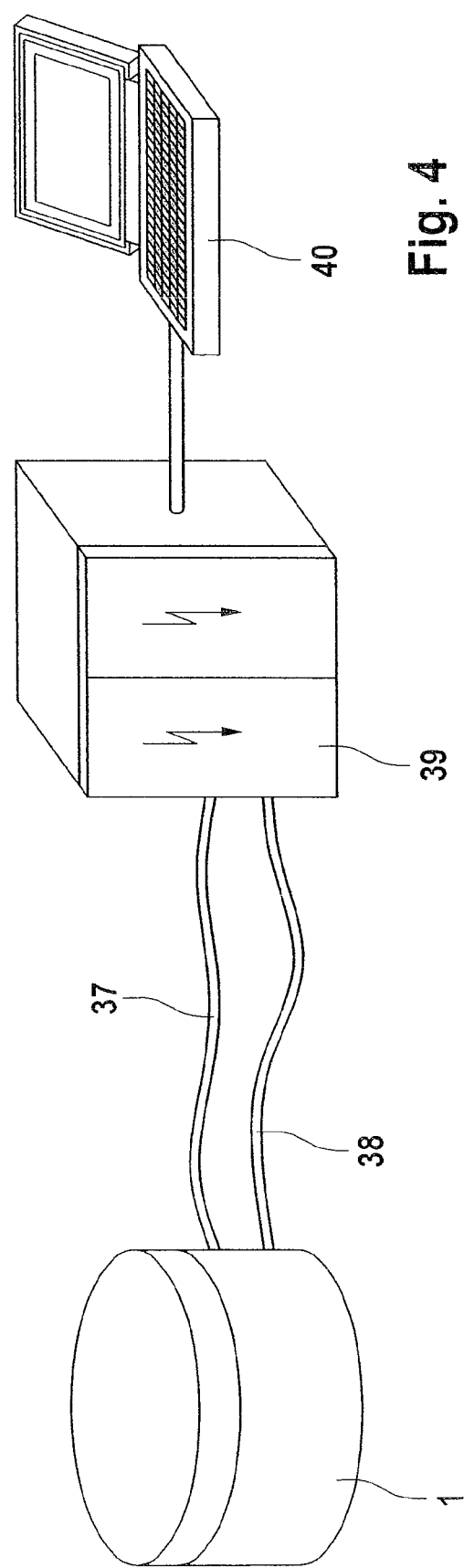

Signals detected by the sensors 22, 23 are transmitted by slip-ring contacts 36 (FIG. 1) to stationary parts. Overall, the rotary table mounting and drive device 1, as shown in FIG. 4, is connected by a signal cable 37 and power cable 38 to a control cabinet 39. Connected to this is, in turn, a data-processing system 40, for example, in the form of a single computer or a computer network that allows, in particular, remote maintenance of the rotary table mounting and drive device 1.

The invention claimed is:

1. Rotary table mounting and drive device, comprising a rotary table supported rotatably on a frame by an axial-radial rolling bearing arrangement and an active magnetic bearing arrangement, and an electric direct drive having a rotor connected rigidly to the rotary table and a stator connected rigidly to the frame;
   a sensor to detect at least one of the parameters of a positioning and a movement state of the rotary table, the sensor is constructed for detecting vibrations of the rotary table; and
   a control device linking the sensor with the active magnetic bearing arrangement that controls the generation of forces by the active magnetic bearing arrangement to counteract vibrations of the rotary table.

2. Device according to claim 1, wherein the electric direct drive is constructed as a permanent magnet-excited synchronous motor.

3. Device according to claim 2, wherein the stator of the electric direct drive is constructed as an excitable primary part of the synchronous motor.

4. Device according to claim 1, wherein the control device comprises several controllers connected in a cascade arrangement.

5. Device according to claim 1, wherein the control device includes different controllers from a group of controllers that comprises a position controller, a velocity controller, an acceleration controller, and a current controller.

6. Device according to claim 1, wherein the control device comprises a pulse-width modulator.

7. Device according to claim 1, wherein the active magnetic bearing arrangement has an excitable primary part connected to the frame and a permanent magnet-equipped secondary part connected to the rotary table.

8. Device according to claim 7, wherein the secondary part of the magnetic bearing arrangement has several magnets each arranged in an annular region.

9. Device according to claim 1, wherein the active magnetic bearing arrangement is arranged radially outside of the axial-radial rolling bearing arrangement.

10. Device according to claim 1, wherein the axial-radial rolling bearing arrangement and the electric direct drive are arranged in axially adjacent regions overlapping radially.

11. Device according to claim 1, wherein the active magnetic bearing arrangement is connected in terms of data to a data-processing system allowing for execution of remote maintenance.

* * * * *